J. CARROLL.
Domestic Boiler.
No. 63,701.
Patented April 9, 1867.
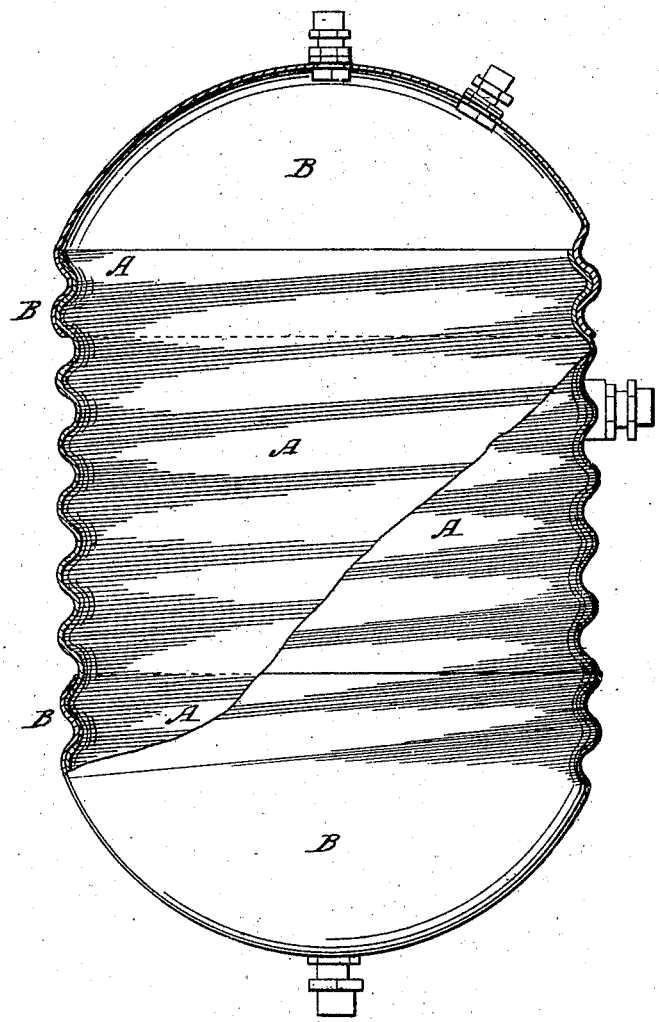
Witnesses:
Theo Tusche
Wm Treurn
Inventor:
J Carroll
Per Munn & Co
Attorneys

United States Patent Office.

JOHN CARROLL, OF NEW YORK, N. Y.

Letters Patent No. 63,701, dated April 9, 1867.

---

IMPROVEMENT IN SHEET-METAL BOILERS AND OTHER VESSELS.

---

The Schedule referred to in these Letters Patent and making part of the same.

---

TO ALL WHOM IT MAY CONCERN:

Be it known that I, JOHN CARROLL, of the city, county, and State of New York, have invented a new and useful Improvement in Sheet-Metal Boilers; and I do hereby declare that the following is a full, clear, and exact description thereof, which will enable others skilled in the art to make and use the same, reference being had to the accompanying drawings, forming part of this specification.

The object of this invention is to so construct copper or other sheet-metal boilers, such as are used in dwellings for heating water, and especially that class of boilers which is stationary, arranged alongside or upon ranges and stoves, that the same may be made of sufficient strength and durability out of very thin sheet metal, and that either one or both heads of the cylindrical vessel may be easily attached to or removed from the same.

The invention consists in the use of a corrugated cylindrical body of the boiler, whereby the same is strengthened, and sufficiently durable, even when made of very thin sheet metal. The corrugations are arranged spirally around the said cylinder, so as to form a screw-thread, which permits the heads of the cylinder, which are provided with similar corrugations, to be screwed to the body. The said heads can, by this arrangement, be secured to the body with great facility, and can be made so as to fit air-tight and be still removable when required; but, when to be firmly attached to the body, cement, solder, or other material, may be used to still more insure the durability and solidity of the article.

This invention is not only applicable to boilers or ranges, and for heating water, but may be used with equal advantage for different purposes, such as cans for holding and transporting liquids and paints, sheet-metal soda-fountains, powder cans, and other articles.

In the annexed drawing, which represents a side elevation, partly in section, of my improved boiler, my invention is illustrated.

A represents the cylindrical body of the boiler, which is corrugated from end to end, the corrugations being arranged spirally, so as to form a screw-thread around the body, as shown. The heads B B, which are cup-shaped, are also provided with spiral corrugations around their sides, and can thus be easily screwed on the body and held thereon. It will be noticed that the metal used in this boiler is very thin; but by the use of the corrugations it is materially strengthened.

Having thus described my invention, I claim as new, and desire to secure by Letters Patent—

Providing the cylindrical body A of sheet-metal vessels with spiral corrugations, which extend from end to end of the body, for the purpose of strengthening the same, as well as to facilitate the attachment of the heads B B to the body, which heads are also corrugated, substantially as herein shown and described.

JOHN CARROLL.

Witnesses:
WM. F. MCNAMARA,
ALEX. F. ROBERTS.